United States Patent [19]

Levin et al.

[11] Patent Number: 5,836,496
[45] Date of Patent: Nov. 17, 1998

[54] VEHICLE CELLULAR PHONE PRESENTATION DEVICE

[75] Inventors: David Hastings Levin, Novi; Jonathan Paul Grasso, Utica; Licheng Tseng, Novi, all of Mich.

[73] Assignee: Ford Motor Company, Dearborn, Mich.

[21] Appl. No.: 870,464

[22] Filed: Jun. 6, 1997

[51] Int. Cl.⁶ .................................................. B60R 11/00
[52] U.S. Cl. .......................... 224/553; 224/275; 224/929; 224/539; 296/37.8; 379/455; 379/426; 379/446; 248/231.41
[58] Field of Search .................................. 224/539, 543, 224/544, 545, 548, 549, 552, 553, 555, 556, 557, 570, 929, 275, 282; 296/37.1, 37.8, 37.15; 379/454, 455, 426, 446, 441; 248/229.22, 231.41

[56] References Cited

U.S. PATENT DOCUMENTS

| | | | |
|---|---|---|---|
| 5,033,709 | 7/1991 | Yuen | 224/929 |
| 5,071,049 | 12/1991 | Mozer . | |
| 5,187,744 | 2/1993 | Richter . | |
| 5,282,246 | 1/1994 | Yang | 379/455 |
| 5,410,597 | 4/1995 | Kepley, III et al. | 379/446 |
| 5,524,050 | 6/1996 | Boerema et al. . | |
| 5,556,017 | 9/1996 | Troy . | |
| 5,588,055 | 12/1996 | Williamson et al. . | |
| 5,659,612 | 8/1997 | Wang | 379/446 |

FOREIGN PATENT DOCUMENTS

| | | | |
|---|---|---|---|
| 2698057 | 11/1992 | France . | |
| 2822378 A1 | 12/1979 | Germany | 224/929 |
| 3355 | 1/1983 | Japan | 379/455 |

*Primary Examiner*—Allan N. Shoap
*Assistant Examiner*—Gregory M. Vidovich
*Attorney, Agent, or Firm*—David B. Kelley

[57] ABSTRACT

A phone presentation device for holding and displaying a portable telephone handset within an automotive vehicle has a housing, an adjustable cradle attached to an inner surface of the housing, and a pivoting mount member for pivotally mounting the housing to a trim piece in the vehicle for movement between a stowed position hidden from view within a depression in the trim piece and a deployed position in which the handset is presented for use. The adjustable cradle has an elongate base member with a handset receiving section, a fixed grip mounted on a first end of the base member, an adjustable grip mounted on a second end of the base member for movement between a first position biasing the handset longitudinally toward the fixed grip and a second position in which the handset may be released from the fixed grip, and a pair of springs for biasing the adjustable grip between the first and second positions. The fixed grip is attached on the first end of the base member toward a free end of the housing movable out of the depression concealing the phone handset. The adjustable grip is mounted on the second end of the base member toward a mount end of the housing for movement between the first position and second positions to provide firm retention of the handset when the presentation device is pivoted from the stowed position to the deployed position.

10 Claims, 6 Drawing Sheets

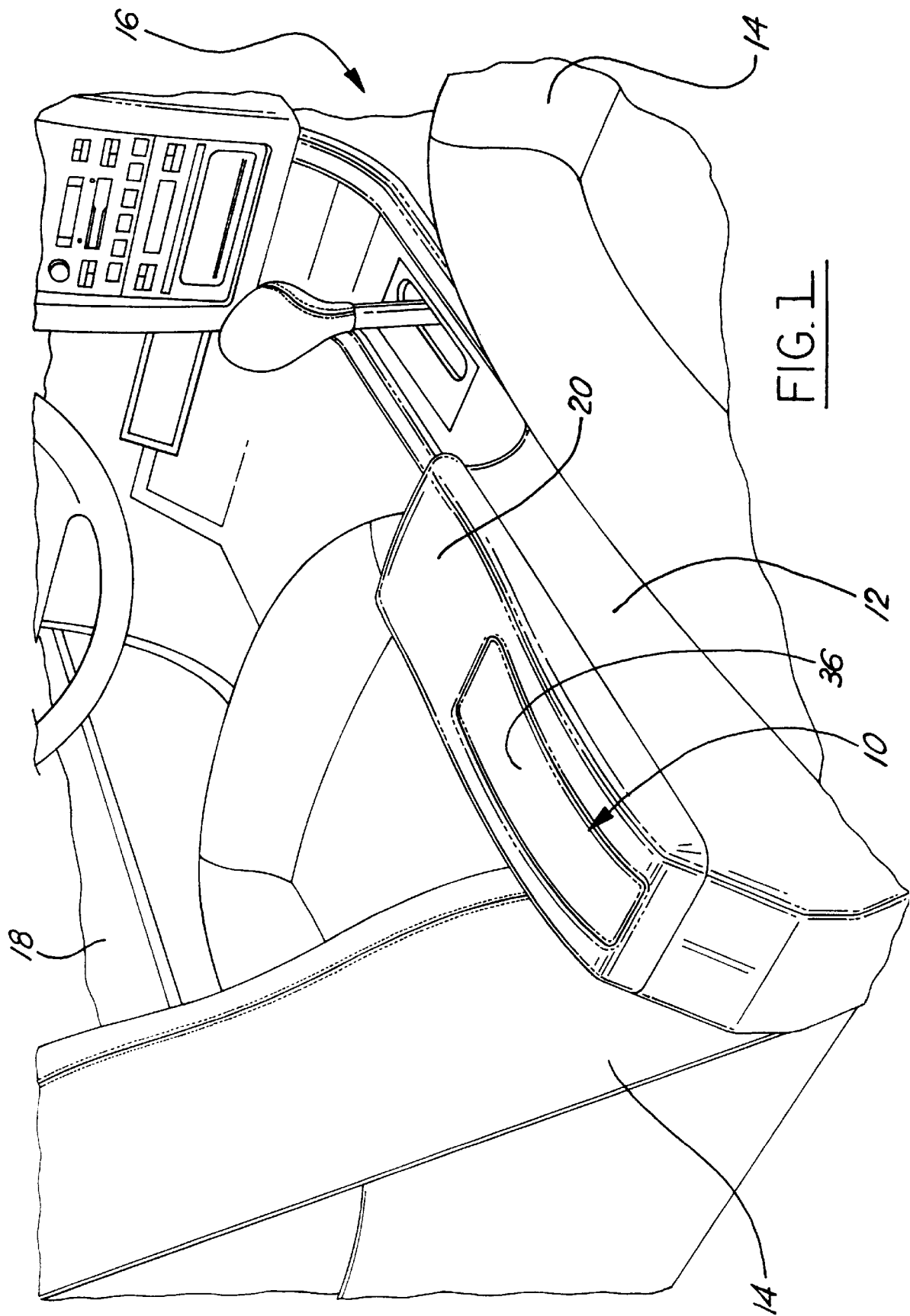

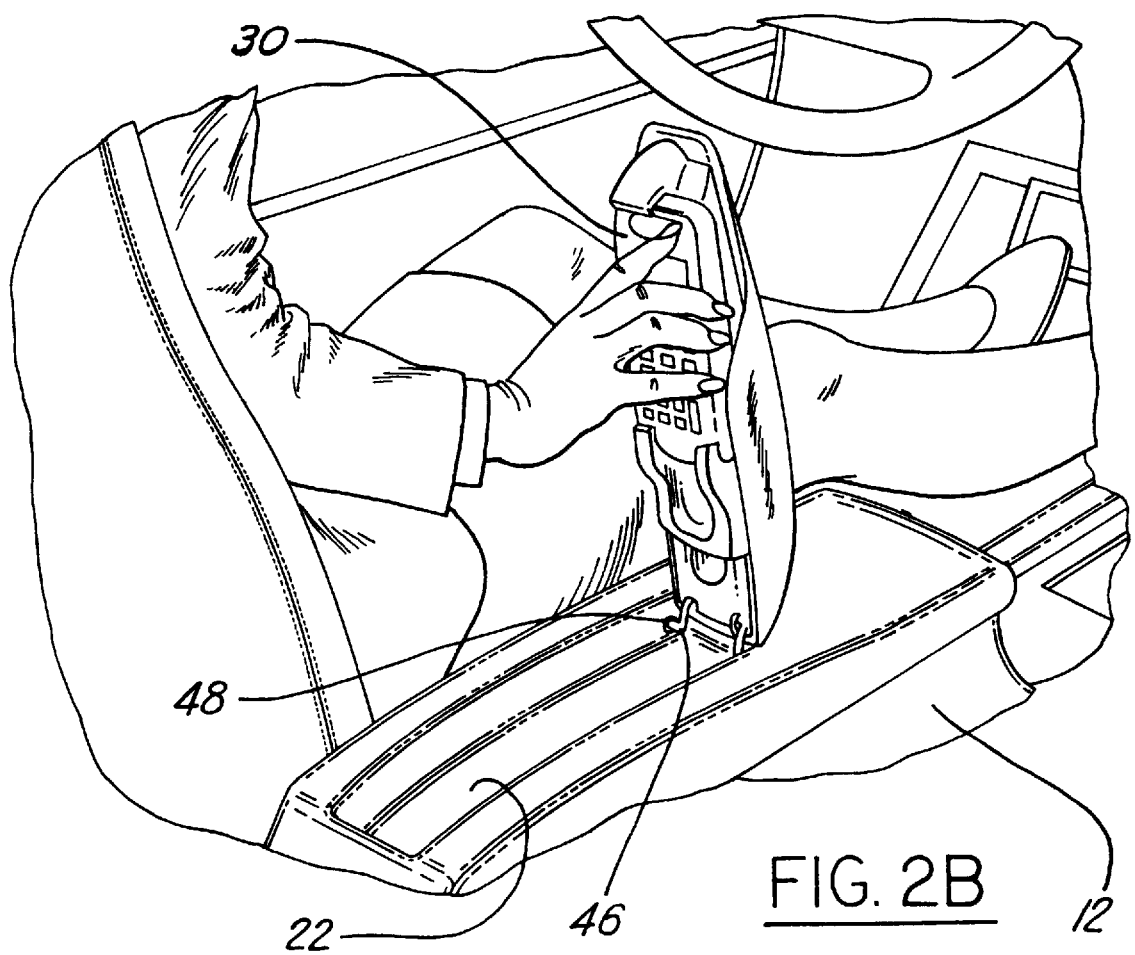

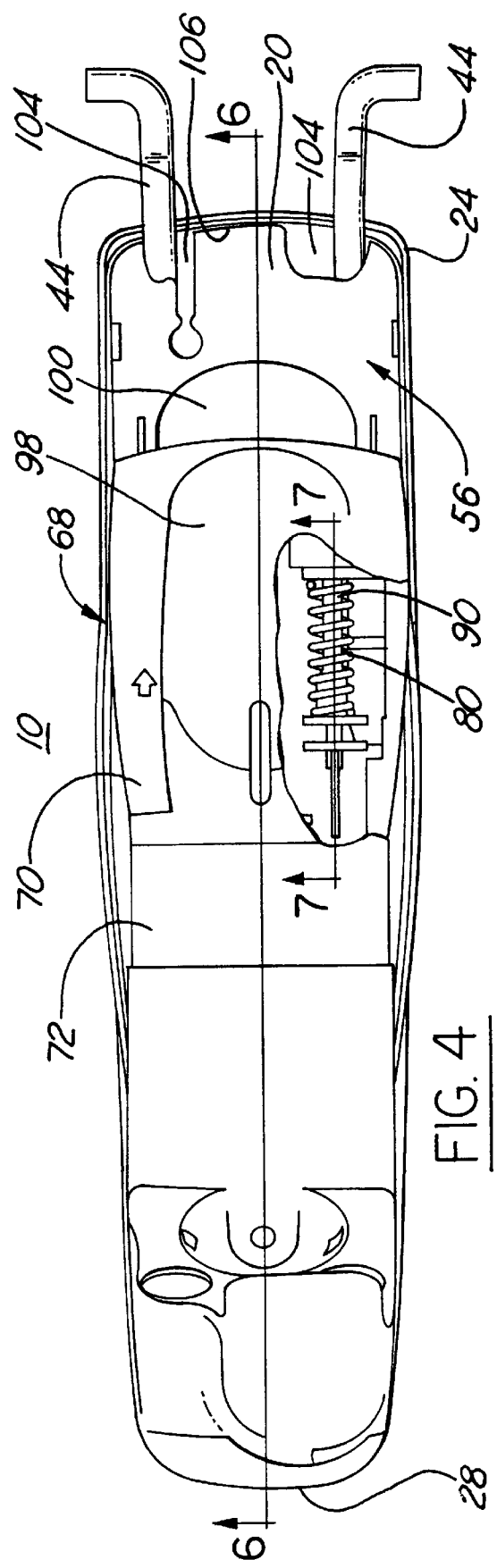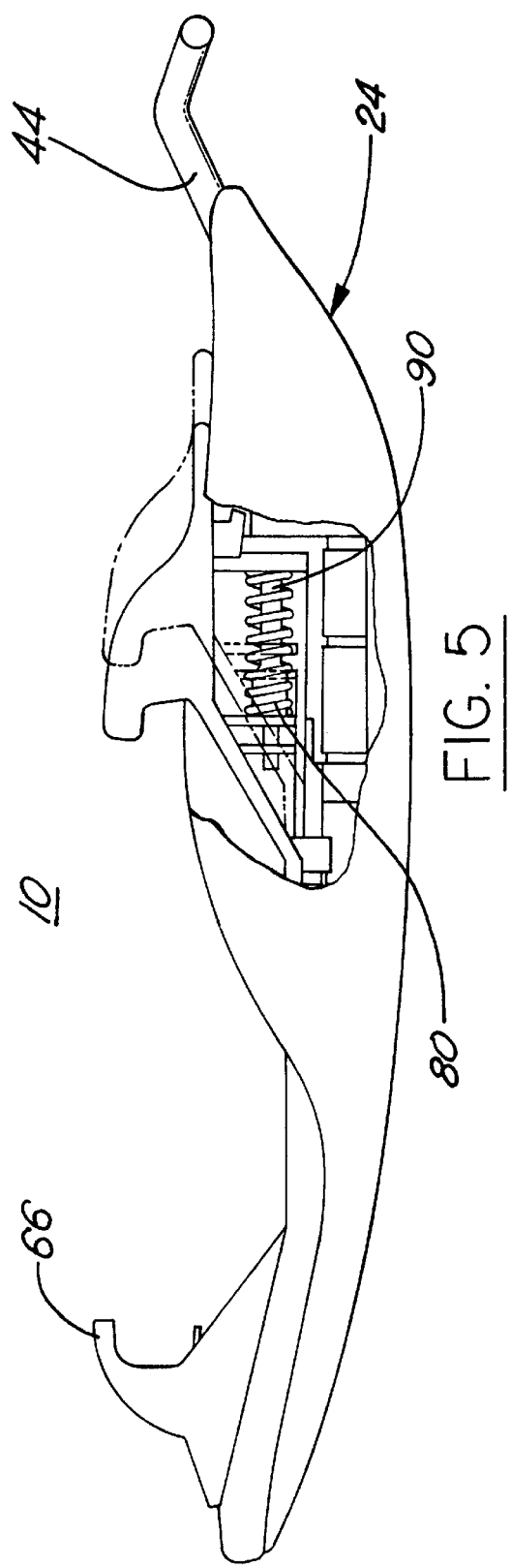

5,836,496

VEHICLE CELLULAR PHONE PRESENTATION DEVICE

FIELD OF THE INVENTION

The present invention relates to vehicle portable phone presentation devices, and more specifically to such a device with a slidable cradle.

BACKGROUND OF THE INVENTION

Proliferation of telephone access within an automotive vehicle has spawned the need for convenient and secure storage and presentation of telephone handsets. These telephone handsets typically include mobile phones, which are connected by a cord to a transmitter/receiver unit, and cellular phones, which do not require such a unit. For cellular phones, it is important that they are easily removable from a presentation device, since such are commonly taken by a user from the vehicle. When kept in the vehicle, storage in a concealed location is desirable to prevent theft, and it is equally desirable to have convenient presentation of the handset for use during vehicle operation.

Various phone presentation approaches have been developed in the field. In U.S. Pat. No. 5,524,050 (Boerema et al), a vehicle storage console has a pivoted cover with a phone cradle and carriage 70 mounted on an underside thereof. Fixed brackets 56 and 58 are mounted on the carriage 70, purportedly to hold a phone handset therein. Such fixed brackets do not permit easy installation and removal of the handset.

A portable telephone holder with laterally adjustable fingers disposed on one side is disclosed in U.S. Pat. No. 5,187,744 (Richter). While such a device allows some flexibility in placing the handset in and removing the handset from the holder, there is no direct longitudinal retention of the handset which is desirable for phone presentation devices which rotate on a pivoting console cover imposing longitudinal forces on the handset.

Other devices, such as those disclosed in U.S. Pat. No. 5,556,017 (Troy), U.S. Pat. No. 5,071,049 (Mozer), and French patent 2,698,057, and other devices in the art, do not provide the ability to adjustably retain a handset longitudinally within a cradle.

SUMMARY OF THE INVENTION

The present invention overcomes the disadvantages of the related art by providing a phone presentation device for holding and displaying a portable telephone handset within an automotive vehicle, the device having a housing, an adjustable cradle attached to an inner surface of the housing, and means for mounting the housing to a trim piece in the vehicle for movement between a stowed position hidden from view within the trim piece and a deployed position in which the handset is presented for use. The adjustable cradle has an elongate base member with a handset receiving section, a fixed grip mounted on a first end of the base member, an adjustable grip mounted on a second end of the base member for movement between a first position biasing the handset longitudinally toward the fixed grip and a second position in which the handset may be released from the fixed grip, and bias means for biasing the adjustable grip between the first and second positions.

In a preferred embodiment, the fixed grip is attached on a first end of the base member toward a free end of the housing movable out of a depression concealing the phone handset. The adjustable grip is mounted on a second end of the base member toward the mount end of the housing for movement between the first position and second position to provide firm retention of the handset when the presentation device is pivoted from the stowed position to the deployed position.

An advantage of the present invention is a phone presentation device for an automotive vehicle which provides easy insertion and removal of a cellular phone handset.

Another advantage of the present invention is a phone presentation device which provides firm retention of a phone handset when the presentation device is pivoted from a stowed position in a console to a deployed position ready for use.

Still another advantage is a phone presentation device which is easy to install in a vehicle console.

A feature of the present invention is a cellular phone handset cradle having a longitudinally adjustable grip.

BRIEF DESCRIPTION OF THE DRAWINGS

These and other objects, advantages, and features of the present invention will be apparent to those skilled in the vehicle phone presentation device arts upon reading the following description with reference to the accompanying drawings, in which:

FIG. 1 is an interior partial perspective view of a vehicle passenger compartment showing a console having a phone presentation device according to the present invention in a stowed position;

FIG. 2B is a perspective view similar to FIG. 2A but showing a vehicle occupant moving a cell phone to a release position within the slidably adjustable cradle of the present invention;

FIG. 4 is a partial cut-away plan view of the presentation device according to the present invention taken in the direction of line 4 in FIG. 2A;

FIG. 5 is a side view of the presentation device of FIG. 4;

DETAILED DESCRIPTION OF THE PREFERRED EMBODIMENTS

Figure 2A:
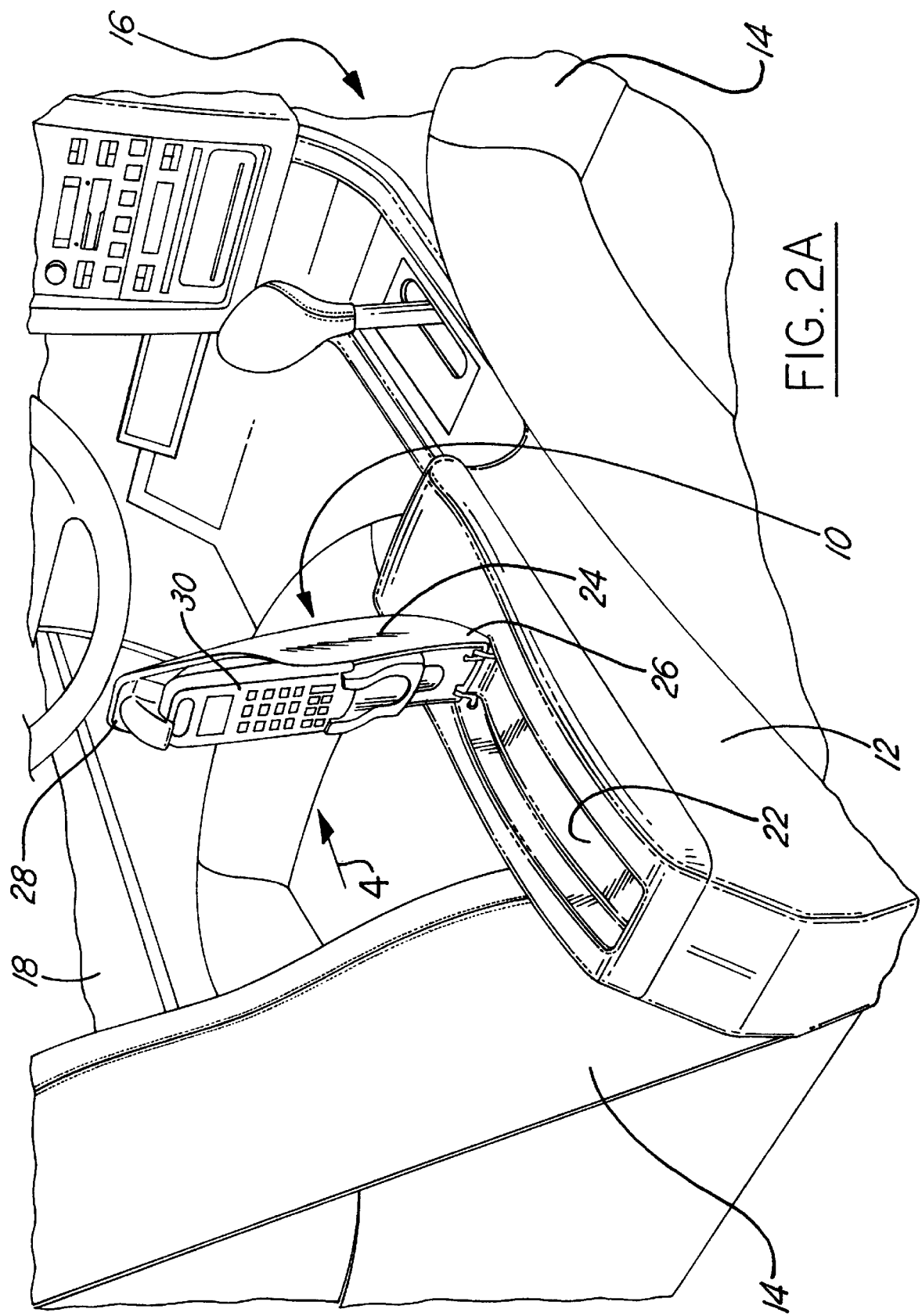
FIG. 2A is a perspective view similar to FIG. 1 but the phone presentation device in a deployed position.

In FIGS. 1 and 2 of the drawings, a phone presentation device 10 according to an embodiment of the present invention is shown in a preferred embodiment mounted in a center console 12 between seats 14 in a passenger compartment, generally indicated at 16, of an automotive vehicle 18. The phone presentation device 10 is mounted on an upper service 20 of the console 12 for movement between a stowed position in (FIG. 1) and a deployed position (FIG. 2) in which the device 10 is pivoted out of a depression 22 in the console upper surface 20. The device 10 has a housing 24 with a pivot end 26 for pivotal movement within the depression 22, and a free end 28 capable of movement out of the depression 22 (FIG. 2). In the stowed position, the free end 28 and the mount end 26 are substantially flushed with the surface 20 of the console 12. When the device 10 is moved to the deployed position (FIG. 2), the free end 28 is rotated away from the surface 20 of the console 12 and the housing 24 is in a substantially non-pointer relationship with the console 12 so that a portable telephone handset 30 releasably retained to the housing 24 as further described below, is presented for use to a vehicle occupant (FIGS. 2 and 3).

Figure 3:
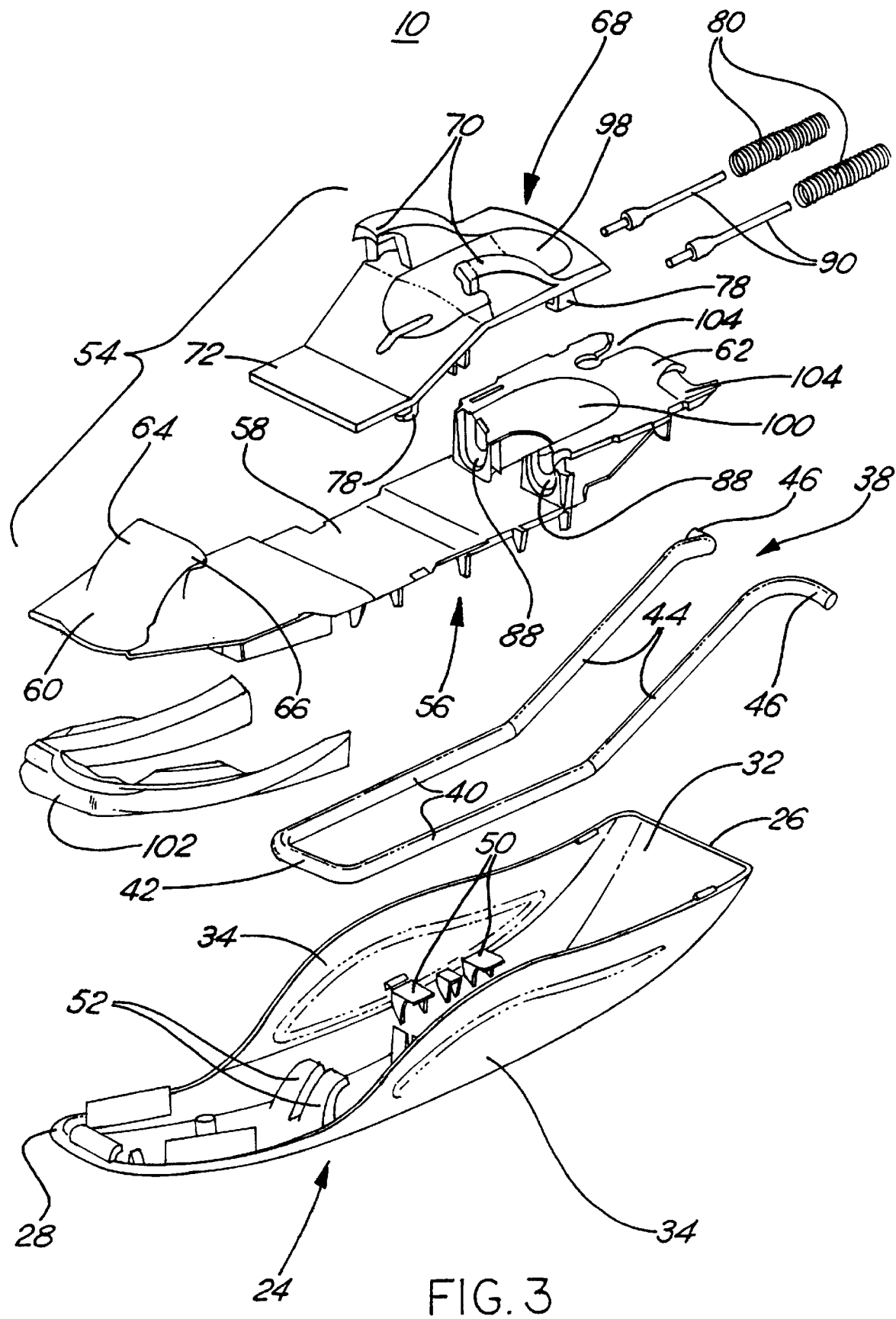
FIG. 3 is an exploded perspective view of a portable phone cradle according to a preferred embodiment of the present invention.
Figure 6:
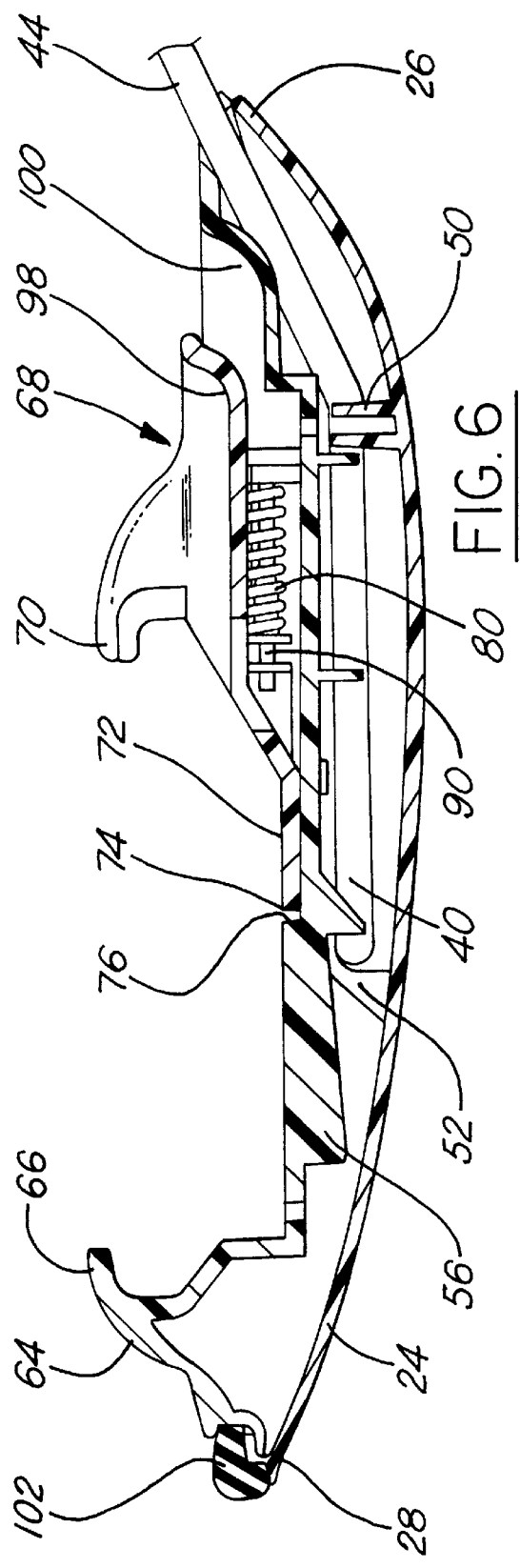
FIG. 6 is a cross-sectional view taken along line 6—6 of FIG. 4.

Turning now to FIG. 3, an exploded perspective view of a preferred embodiment of the phone presentation device 10 according to the present invention is shown. Beginning at the bottom of FIG. 3, the housing 24 is shown as having an inner surface 32 and a pair of opposed side walls 34 as best seen in FIG. 1. The housing 24 has an outer surface 36 which preferably is shaped to conform to the surface 20 of the console 12. Attached to the inner surface 32 is a generally U-shaped pivot member 38 having rails 40 extending from a cross member 42, a pair of legs 44 angled away from a plane formed by the rails 40 and the cross member 42 so as to fit the contour of the inner surface 32 of the housing 24. Each leg 44 has a connector 46 extending perpendicularly thereto away from the opposite leg for mounting within mount holes 48 within the depression 22 of the console 12 (FIGS. 2A and 3). The pivot member 38 is mounted to the inner surface 32 of the housing 24 by rail clips 50 which clip on to rails 40, and cross-member clips 52 which clip on to the cross member 42 (FIG. 3). Attachment of the pivot member 38 to the housing 24 is accomplished by placing the cross-member 42 against the cross-member clips 52, grasping the legs 44 and pushing them together in order to position the rails 40 together to allow positioning under the rail clips 50, at which time the legs 44 are released and the rails 40 moved into the clips 50.

Still referring to FIG. 3, the present invention employs an adjustable cradle 54 which receives the portable telephone handset 30. The adjustable cradle 54 has an elongate based member 56 which attaches to the inner surface 32 of the housing 24. The base member 56 has a handset receiving section 58 for receiving the handset 30 therein, generally between a first end 60 and a second end 62 of the base member 56. The first end 60 has a fixed grip 64 having a finger member 66 for retaining a first handset end. The fixed grip 64 is integrally molded with the base member 56. It is important to note that the first base end 60 of the base member 56 is attached to the free end 28 of the housing 24 to provide firm retention of the handset 30 when the presentation device 10 is pivoted from the stowed position to the deployed position.

Mounted on the second base end 62 of the base member 56 is an adjustable grip 68 which is longitudinally slidable with respect to the base member 56. It is important that the second base end 62 be attached to the mount end 26 of the housing 24 so that the adjustable grip 68 provides an appropriate longitudinal force toward the free end 28 during movement of the housing 24 between the stowed and deployed positions. The adjustable grip 68 has a pair of prongs 70 for gripping a second handset end of the handset. The adjustable grip 68 can thus move between a first position biasing the handset 30 longitudinally toward the fixed grip 64 and a second position in which the prongs 70 retract from the second handset end so as to allow the handset 30 to be released from the fixed grip 64 (FIGS. 4 and 5).

The adjustable grip 68 has a flange 72 which is generally planar with the handset receiving portion 58 of the base member 56 and slides parallel thereto (FIGS. 3 and 4). A forward surface 74 of the flange 72 abuts a stop surface 76 of the base member 56 to limit motion of the adjustable grip 68.

Figure 7:
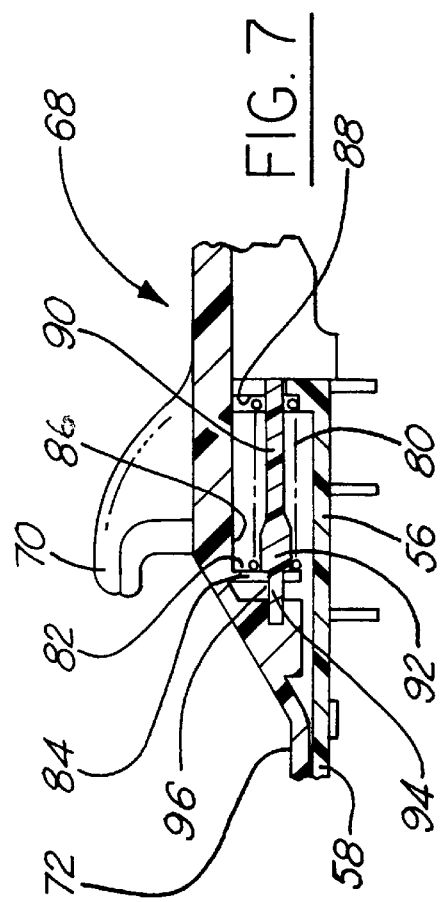
FIG. 7 is a cross-sectional view taken along line 7—7 of FIG. 4.

The adjustable grip 68 is mounted to the base member with L-shaped clips 78 (FIG. 3) which allow slideable movement of the adjustable grip 68 between the first and second positions gripping and releasing the handset 30. The adjustable grip 68 is biased to the first position, that is the gripping position, by a pair of longitudinally acting coil springs 80 (FIG. 3) mounted between a stop surface 82 on a tab 84 descending from a lower surface 86 of the adjustable grip 68 (FIG. 7) and a spring seat 88 on the base member 56 (FIGS. 3 and 7). Connected to the base member 56 and running axially through the springs 80 are a pair of spring guide members 90 (FIGS. 3–7). The guide members 90 preferably have an enlarged section 92 abutting the tab 84 of the adjustable grip 68 and an axle member 94 passing through an opening 96 of the tab 84 (FIG. 7). Preferably, the springs 80 and guide members 90 are mounted directly beneath the prongs 70 of the adjustable grip 68 to more directly impart the desired longitudinal force thereto.

The adjustable grip 68 preferably has a central oval shaped bowl 98 (FIGS. 3 and 4) which mates with a base bowl 100 (FIGS. 3, 4 and 6), the base bowl 100 being semi-oval shaped.

A seal member 102, preferably made of a sponge rubber or other cushioning material, is placed around the peripheral edge of the fixed end 60 of the base member 56 and the free end 28 of the housing 24 (FIG. 3). The second end 62 of the base member 56 has a pair of laterally extending notches 104 along a rear edge 106 thereof to allow the legs 44 of the pivot member 38 to extend from between the base member 56 and the housing 24 (FIGS. 3 and 4).

Although the preferred embodiment of the present invention has been disclosed, various changes and modifications may be made without departing from the scope of the invention as set forth in the appended claims.

We claim:

1. A phone presentation device for holding and displaying a portable telephone handset within an automotive vehicle, the presentation device comprising:

a housing;

an adjustable cradle attached to an inner surface of the housing and having:

an elongate base member with a handset receiving section;

a fixed grip mounted on a first end of the base member;

an adjustable grip mounted on a second end of the base member for movement between a first position biasing the handset longitudinally toward the fixed grip and a second position in which the handset may be released from the fixed grip; and bias means for biasing the adjustable grip between the first and second positions;

means for mounting the housing to a trim piece in the vehicle for movement between a stowed position in which the cradle and handset is hidden from view within the trim piece and a deployed position in which the handset is presented for use; and wherein the means for mounting comprises a generally U-shaped pivot member attached within the housing and having a pair of connectors adapted to be attached to the trim piece.

2. A device according to claim 1 wherein the pivot member has a pair of rails extending from a cross-member and a pair of legs angled away from a plane formed by the rails and the cross-member so as to fit the contour of an inner surface of the housing.

3. A device according to claim 1 wherein the bias means comprises at least one spring member attached between the adjustable grip and the base member.

4. A device according to claim 1 wherein the fixed grip is integrally molded with the base member.

5. A phone presentation device for holding and alternately displaying and stowing a portable telephone handset within a trim piece in an automotive vehicle, the presentation device comprising:

a housing having a pivot end adapted to be attached to the trim piece for pivotal movement there around and a free end capable of movement away from the trim piece;

pivot means adapted to be attached between the pivot end and the trim piece for pivoting the housing between a stowed position in which both the free end and the pivot end of the housing are substantially flush with a surface of the trim piece, and a deployed position in which the free end is rotated away from the trim piece with the housing in a substantially non-planar relationship with the trim piece so that the handset is presented for use; and an adjustable cradle attached to an inner surface of the housing and having:

an elongate base member with a handset receiving section for receiving the handset therein;

a fixed grip attached on a first end of the base member toward the free end of the housing an adjustable grip mounted on a second end of the base member toward the pivot end of the housing for movement between a first position biasing the handset longitudinally toward the fixed grip to provide retention of the handset when the presentation device is pivoted from the stowed position to the deployed position, and a second position in which the handset may be released from the fixed grip; and at least one bias member mounted between the base member and the adjustable grip to bias the adjustable grip between the first and second positions.

6. A phone presentation device for a portable telephone handset stowable within a console in an automotive vehicle, the console having an upper surface with a depression therein for receiving the handset, the presentation device comprising:

a housing having a pivot end for pivotal movement within the depression and a free end capable of movement out of the depression;

pivot means adapted to be attached between the pivot end and the trim piece for pivoting the housing between a stowed position in which both the free end and the pivot end of the housing are substantially flush with a surface of the trim piece, and a deployed position in which the free end is rotated away from the trim piece so that the housing is in a substantially non-planar relationship with the trim piece so that the handset is presented for use; and an adjustable cradle attached to an inner surface of the housing and having:

an elongate base member with a handset receiving section for receiving the handset therein;

a fixed grip attached on a first end of the base member toward the free end of the housing having at least one finger member for retaining a first end of the handset;

an adjustable grip, longitudinally slidable with respect to the base member, mounted on a second end of the base member toward the pivot end of the housing, the adjustable grip having a pair of prongs gripping a second end of the handset for movement between a first position biasing the handset longitudinally toward the fixed grip to provide retention of the handset when the presentation device is pivoted from the stowed position to the deployed position, and a second position in which the handset may be released from the fixed grip; and pair of springs mounted between the base member and the adjustable grip to bias the adjustable grip between the first and second positions.

7. A device according to claim 6 wherein the pair of springs are coil springs mounted between a stop surface on the adjustable grip and a spring seat on the base member to provide a longitudinal force to the adjustable grip.

8. A device according to claim 6 wherein a pair of spring guide members are connected to the base member and run axially through the pair of springs.

9. A device according to claim 8 wherein the guide members have an enlarged section abutting a push tab extending from the adjustable grip and an axle member passing through an opening in the push tab.

10. A device according to claim 8 wherein the springs and the guide members are mounted beneath the prongs of the adjustable grip to more directly impart a longitudinal force thereto.

* * * * *